US012580741B2

(12) United States Patent　(10) Patent No.:　US 12,580,741 B2
Bai et al.　(45) Date of Patent:　Mar. 17, 2026

(54) DATA TRANSMISSION METHOD AND SYSTEM, COMPUTER DEVICE, AND STORAGE MEDIUM

(71) Applicant: Beijing Volcano Engine Technology Co., Ltd., Beijing (CN)

(72) Inventors: Zhenxuan Bai, Beijing (CN); Yuwei Zheng, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 37 days.

(21) Appl. No.: 18/583,615

(22) Filed: Feb. 21, 2024

(65) Prior Publication Data

US 2024/0413981 A1　Dec. 12, 2024

(30) Foreign Application Priority Data

Feb. 23, 2023　(CN) .......................... 202310161692.7

(51) Int. Cl.
*H04L 9/32*　(2006.01)
*H04L 9/08*　(2006.01)
(52) U.S. Cl.
CPC .......... *H04L 9/0825* (2013.01); *H04L 9/3263* (2013.01)
(58) Field of Classification Search
None
See application file for complete search history.

(56) References Cited

U.S. PATENT DOCUMENTS

2023/0069234 A1* 3/2023 Li .......................... H04L 9/3252

FOREIGN PATENT DOCUMENTS

| CN | 108712388 A | 10/2018 |
|----|-------------|---------|
| CN | 110113351 A | 8/2019 |
| CN | 111585749 A | 8/2020 |
| CN | 112187832 A | 1/2021 |
| CN | 113422832 A | 9/2021 |
| CN | 113691502 A | 11/2021 |
| CN | 114651421 A | 6/2022 |
| CN | 114900324 A | 8/2022 |

OTHER PUBLICATIONS

China Patent Application No. 202310161692.7; Office Action; dated Oct. 12, 2024; 9 pages.
China Patent Application No. 202310161692.7; Third Office Action; dated Aug. 18, 2025; 12 pages.

* cited by examiner

*Primary Examiner* — Cai Y Chen
(74) *Attorney, Agent, or Firm* — BakerHostetler

(57) ABSTRACT

The embodiments of the present disclosure provide a data transmission method and system, a computer device, and a storage medium, and the data transmission method includes: generating, in response to a data transmission instruction, a first key based on a temporary private key generated by the client and a first public key generated by a target server; encrypting target data in data to be transmitted to obtain target encryption data based on the first key; and sending target transmission data to the target server to cause the target server to generate a second key corresponding to the first key based on a temporary public key and a first private key corresponding to the first public key, and to decrypt the target encryption data based on the second key.

13 Claims, 5 Drawing Sheets

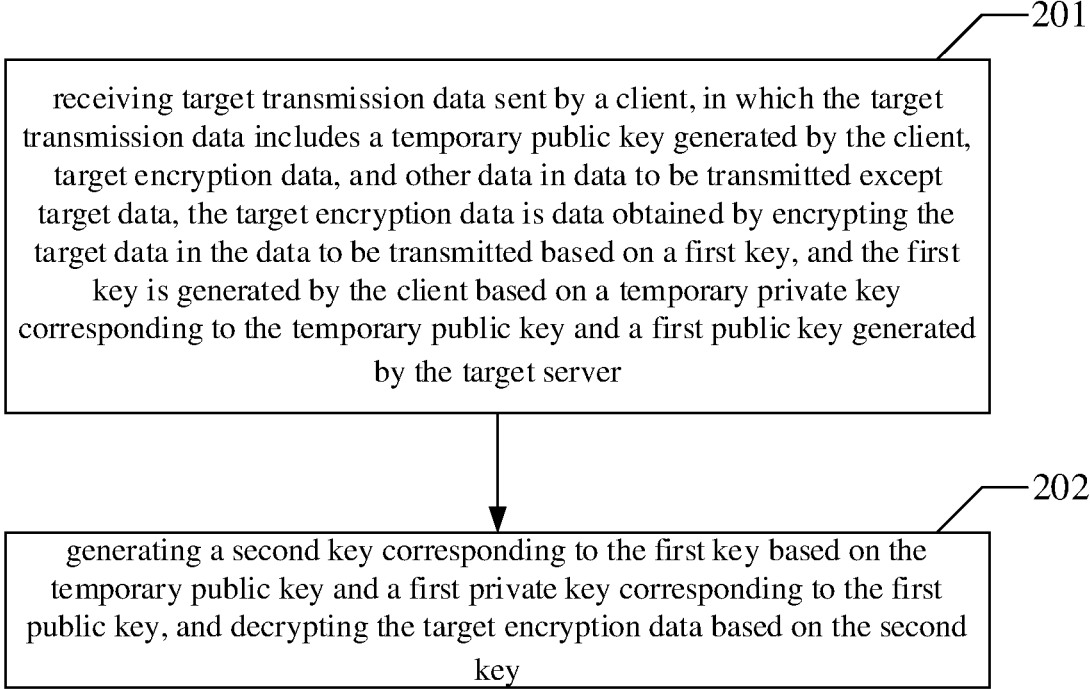

201 receiving target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server

202 generating a second key corresponding to the first key based on the temporary public key and a first private key corresponding to the first public key, and decrypting the target encryption data based on the second key

FIG. 2

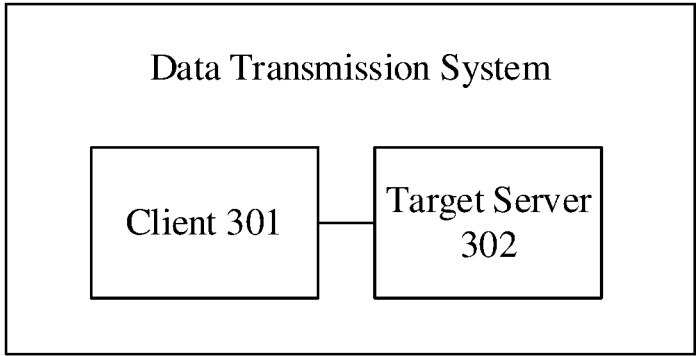

Data Transmission System

Client 301

Target Server 302

FIG. 3

DATA TRANSMISSION METHOD AND SYSTEM, COMPUTER DEVICE, AND STORAGE MEDIUM

CROSS-REFERENCE TO RELATED APPLICATION

The present application claims priority of the Chinese Patent Application No. 202310161692.7, filed on Feb. 23, 2023, the disclosure of which is incorporated herein by reference in the present application.

TECHNICAL FIELD

Embodiments of the present disclosure relate to a data transmission method, system, and apparatus, a computer device, and a storage medium.

BACKGROUND

With the development of information technology, more and more people use clients to communicate on the network. After a client sends out data to be transmitted, the data to be transmitted usually needs to be processed by several intermediate servers (e.g., gateway servers, load balancing servers, cache servers, etc.) and then forwarded to a target server. When the data to be transmitted is sent to an intermediate server, sensitive data (such as the user's personal information) in the data to be transmitted may easily be leaked.

For example, according to the Hypertext Transfer Protocol Secure (HTTPS), the data to be transmitted sent by the client is encrypted, but each intermediate server stores a key to decrypt the encrypted transmission data, so each intermediate server can still decrypt the encrypted data to be transmitted and obtain the sensitive data in the data to be transmitted. Therefore, how to ensure the data security of the sensitive data in the data to be transmitted has become an urgent problem to be solved.

SUMMARY

The embodiments of the present disclosure at least provide a data transmission method, system, and apparatus, a computer device, and a storage medium.

In a first aspect, the embodiments of the present disclosure provide a data transmission method, including:

generating, in response to a data transmission instruction, a first key based on a temporary private key generated by the client and a first public key generated by a target server;

encrypting target data in data to be transmitted to obtain target encryption data based on the first key;

and sending target transmission data to the target server to cause the target server to generate a second key corresponding to the first key based on a temporary public key and a first private key corresponding to the first public key, and to decrypt the target encryption data based on the second key, in which the target transmission data includes the temporary public key generated by the client corresponding to the temporary private key, the target encryption data, and other data in the data to be transmitted except the target data.

In a possible embodiment, after responding to the data transmission instruction, the data transmission method further includes:

sending a data transmission request to the target server;

and receiving a verification certificate sent by the target server;

and sending the target transmission data to the target server includes:

determining a second public key included in the verification certificate;

encrypting the target transmission data based on the second public key to obtain encrypted target transmission data;

and sending the encrypted target transmission data to the target server.

In a possible embodiment, sending the target transmission data to the target server includes:

sending the target transmission data to at least one intermediate server to cause the at least one intermediate server to send the target transmission data to the target server.

In a possible embodiment, the at least one intermediate server includes at least one selected from a group consisting of a load balancing server, a gateway server, and a cache server.

In a possible embodiment, the data transmission method further includes:

generating, in response to satisfying a key generation condition, the temporary private key and the temporary public key corresponding to the temporary private key based on a preset key generation algorithm.

In a second aspect, the embodiments of the present disclosure further provide a data transmission method, including:

receiving target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server;

and generating a second key corresponding to the first key based on the temporary public key and a first private key corresponding to the first public key, and decrypting the target encryption data based on the second key.

In a possible embodiment, the data transmission method further includes:

receiving a data transmission request sent by the client, and sending a verification certificate to the client;

receiving the target transmission data sent by the client includes:

receiving encrypted target transmission data sent by the client, in which the encrypted target transmission data includes data obtained by encrypting the target transmission data based on a second public key in the verification certificate;

and decrypting the encrypted target transmission data based on a second private key corresponding to the second public key, to obtain the target transmission data.

In a possible embodiment, the first public key generated by the target server is transmitted to the client through a non-network transmission method.

In a third aspect, the embodiments of the present disclosure further provide a data transmission system, including:

a client, which is configured to generate, in response to a data transmission instruction, a first key based on a temporary private key generated by the client and a first public key generated by a target server, encrypt target data in data to be transmitted to obtain the target encryption data based on the first key, and send target transmission data to the target server, in which the target transmission data includes a temporary public key generated by the client corresponding to the temporary private key, the target encryption data, and other data in the data to be transmitted except the target data;

and a target server, which is configured to generate a second key corresponding to the first key based on the temporary public key and a first private key corresponding to the first public key, and decrypt the target encryption data based on the second key.

In a fourth aspect, the embodiments of the present disclosure further provide a data transmission apparatus, including:

a generation module, which is configured to generate, in response to a data transmission instruction, a first key based on a temporary private key generated by the client and a first public key generated by a target server;

an encryption module, which is configured to encrypt target data in data to be transmitted to obtain target encryption data based on the first key;

and a sending module, which is configured to send target transmission data to the target server to cause the target server to generate a second key corresponding to the first key based on a temporary public key and a first private key corresponding to the first public key, and to decrypt the target encryption data based on the second key, in which the target transmission data includes the temporary public key generated by the client corresponding to the temporary private key, the target encryption data, and other data in the data to be transmitted except the target data.

In a possible embodiment, after responding to the data transmission instruction, the data transmission apparatus is further configured to:

send a data transmission request to the target server;

and receive a verification certificate sent by the target server;

the sending module, when sending the target transmission data to the target server, is configured to:

determine a second public key included in the verification certificate;

encrypt the target transmission data based on the second public key to obtain encrypted target transmission data;

and send the encrypted target transmission data to the target server.

In a possible embodiment, the sending module, when sending the target transmission data to the target server, is configured to:

send the target transmission data to at least one intermediate server to cause the at least one intermediate server to send the target transmission data to the target server.

In a possible embodiment, the at least one intermediate server includes at least one selected from a group consisting of a load balancing server, a gateway server, and a cache server.

In a possible embodiment, the data transmission apparatus is further configured to:

generate, in response to satisfying a key generation condition, the temporary private key and the temporary public key corresponding to the temporary private key based on a preset key generation algorithm.

In a fifth aspect, the embodiments of the present disclosure further provide a data transmission apparatus, including:

a receiving module, which is configured to receive target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server;

and a decryption module, which is configured to generate a second key corresponding to the first key based on the temporary public key and a first private key corresponding to the first public key, and decrypt the target encryption data based on the second key.

In a possible embodiment, the data transmission apparatus is further configured to:

receive a data transmission request sent by the client, and send a verification certificate to the client;

the receiving module, when receiving the target transmission data sent by the client, is configured to:

receive encrypted target transmission data sent by the client, in which the encrypted target transmission data includes data obtained by encrypting the target transmission data based on a second public key in the verification certificate;

and decrypt the encrypted target transmission data based on a second private key corresponding to the second public key, to obtain the target transmission data.

In a possible embodiment, the first public key generated by the target server is transmitted to the client through a non-network transmission method.

In a sixth aspect, the embodiments of the present disclosure further provide a computer device, including a processor, a memory and a bus; the memory stores machine-readable instructions executable by the processor, and when the computer device is running, the processor and the memory communicate with each other through the bus; and when the machine-readable instructions are executed by the processor, steps in the first aspect, or in any of the possible embodiments of the first aspect are implemented, or steps in the second aspect, or in any of the possible embodiments of the second aspect are implemented.

In a seventh aspect, the embodiments of the present disclosure further provide a computer-readable storage medium, a computer program is stored on the computer-readable storage medium, and when the computer program is run by a processor, steps in the first aspect, or in any of the possible embodiments of the first aspect are implemented, or steps in the second aspect, or in any of the possible embodiments of the second aspect are implemented.

The data transmission method, system and apparatus, computer device and storage medium provided by the embodiments of the present disclosure can generate, after responding to a data transmission instruction, a first key based on a temporary private key generated by the client and a first public key generated by a target server; then encrypt target data in data to be transmitted to obtain target encryption data based on the first key; and finally, send target transmission data, which includes a temporary public key generated by the client corresponding to the temporary private key, the target encryption data, and other data in the data to be transmitted except the target data, to the target server. In this way, because the target server receives the temporary public key and a first private key corresponding to the first public key is stored in the target server, the target server can generate a second key corresponding to the first key, and decrypt the target encryption data based on the second key to obtain the target data. Even if an intermediate server obtains the target encryption data, because the intermediate server can only obtain the temporary public key, and cannot generate a key to decrypt the target encryption data, the target encryption data cannot be decrypted to obtain the target data, thereby ensuring the data security of the target data and avoiding leakage of the target data.

In order to make the above-mentioned objects, features and advantages of the present disclosure more obvious and understandable, preferred embodiments are given below and described in detail with reference to the drawings.

BRIEF DESCRIPTION OF DRAWINGS

To explain the technical solutions of the embodiments of the present disclosure more clearly, the drawings required to be used in the embodiments will be briefly introduced below. The drawings here are incorporated into the specification and constitute a part of this specification. These drawings illustrate embodiments consistent with the present disclosure and, together with the specification, explain the technical solutions of the present disclosure. It should be understood that the following drawings only illustrate certain embodiments of the present disclosure, and therefore should not be regarded as limiting the scope. For those of ordinary skill in the art, without exerting creative efforts, other relevant drawings may also be obtained based on these drawings.

FIG. 2 illustrates a flowchart of another data transmission method provided by the embodiments of the present disclosure;

FIG. 3 illustrates a schematic diagram of a data transmission system provided by the embodiments of the present disclosure;

DETAILED DESCRIPTION

Figure 1:
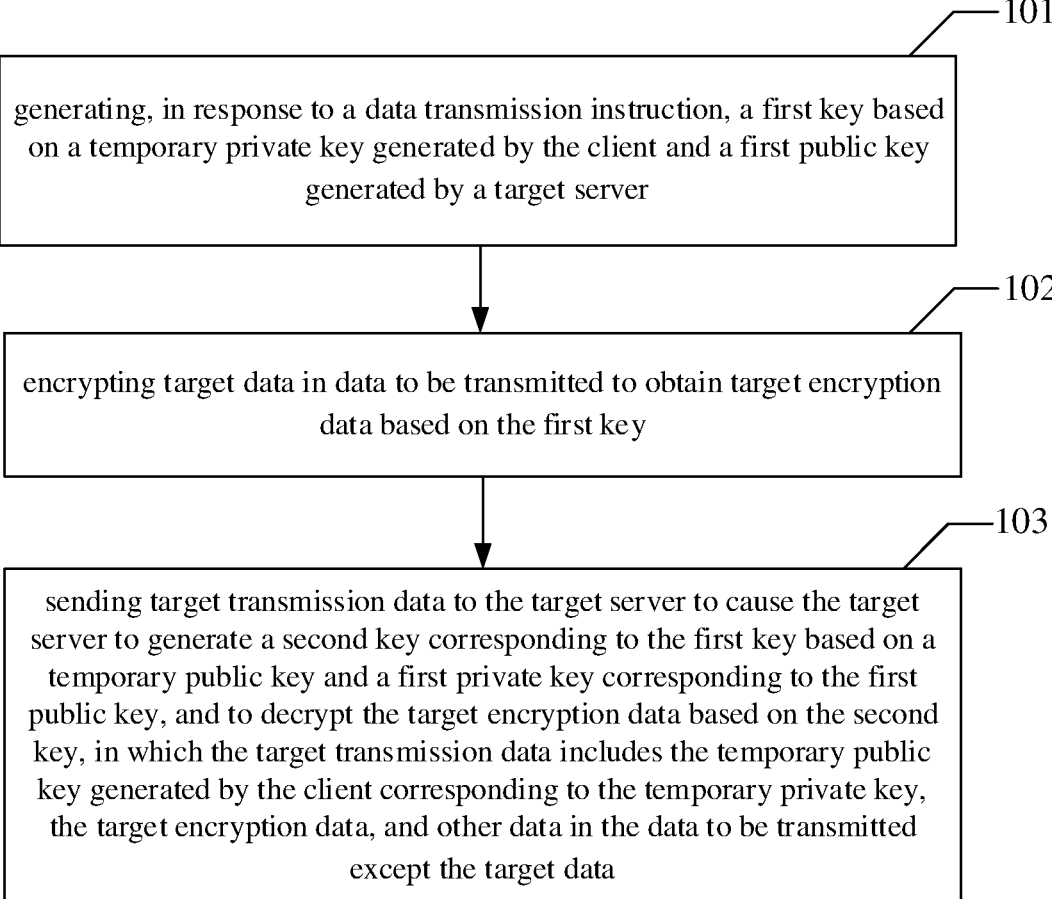
FIG. 1 illustrates a flowchart of a data transmission method provided by the embodiments of the present disclosure.

In order to make the objects, technical solutions and advantages of the embodiments of the present disclosure clearer, the technical solutions of the embodiments of the present disclosure will be described clearly and completely below with reference to the drawings in the embodiments of the present disclosure. Obviously, the described embodiments are only part of the embodiments of the present disclosure, but not all embodiments. The components of the embodiments of the present disclosure generally described and illustrated in the drawings herein may be arranged and designed in a variety of different configurations. Therefore, the following detailed description of the embodiments of the present disclosure provided in the drawings is not intended to limit the protection scope of the present disclosure, but rather to represent selected embodiments of the present disclosure. Based on the embodiments of the present disclosure, all other embodiments obtained by those skilled in the art without any creative efforts shall fall within the protection scope of the present disclosure.

In the encryption method using Hypertext Transfer Protocol Secure (HTTPS), the target server and the client usually generate symmetric keys to respectively encrypt and decrypt the data to be transmitted sent by the client, to ensure the data security of the data to be transmitted during transmission. However, before the data to be transmitted is sent to the target server, the data to be transmitted usually needs to be processed by an intermediate server. For example, respective distribution servers in a content delivery network (CDN) need to distribute the data to be transmitted to different servers for processing based on part of the data to be transmitted, and the gateway server can audit the data to be transmitted. Therefore, the intermediate server usually holds the key to decrypt the encrypted data to be transmitted, so that each intermediate server can directly obtain the plaintext data of the data to be transmitted, which may easily cause the leakage of sensitive information in the data to be transmitted.

Based on the above research, the present disclosure provides a data transmission method, system and apparatus, a computer device and a storage medium, which can generate, after responding to a data transmission instruction, a first key based on a temporary private key generated by the client and a first public key generated by a target server; then encrypt target data in data to be transmitted to obtain target encryption data based on the first key; and finally, send target transmission data, which includes a temporary public key generated by the client corresponding to the temporary private key, the target encryption data, and other data in the data to be transmitted except the target data, to the target server. In this way, because the target server receives the temporary public key and a first private key corresponding to the first public key is stored in the target server, the target server can generate a second key corresponding to the first key, and decrypt the target encryption data based on the second key to obtain the target data. Even if an intermediate server obtains the target encryption data, because the intermediate server can only obtain the temporary public key, and cannot generate a key to decrypt the target encryption data, the target encryption data cannot be decrypted to obtain the target data, thereby ensuring the data security of the target data and avoiding leakage of the target data.

It should be noted that similar reference numerals and letters represent similar items in the following drawings, therefore, once an item is defined in one drawing, it does not need to be further defined and explained in subsequent drawings.

The term "and/or" in the present disclosure only describes an association relationship, indicating that three relationships can exist. For example, A and/or B may mean: A exists alone, A and B exist simultaneously, and B exists alone. In addition, the term "at least one" herein means any one of a plurality or any combination of at least two of a plurality, for example, including at least one of A, B, and C may mean including any one or more elements selected from the set consisting of A, B, and C.

It may be understood that before using the technical solutions disclosed in the embodiments of the present disclosure, users should be informed of the type, scope of use, usage scenarios, etc. of the personal information involved in the present disclosure in an appropriate manner in accordance with relevant laws and regulations and the user's authorization is obtained.

For example, in response to receiving an active request from a user, a prompt message is sent to the user to clearly remind the user that the operation requested will require the acquisition and use of the user's personal information. Therefore, users can autonomously choose whether to provide personal information to software or hardware such as an electronic device, an application, a server or a storage medium that perform the operations of the technical solution of the present disclosure based on the prompt information.

As an optional but non-limiting implementation, in response to receiving an active request form a user, the method of sending prompt information to the user may be, for example, a pop-up window, and the prompt information may be presented in the form of text in the pop-up window. In addition, the pop-up window may also contain a selection control for the user to choose "agree" or "disagree" to provide personal information to an electronic device.

It may be understood that the above-mentioned process of notifying and obtaining user authorization is only illustrative and does not limit the implementation of the present disclosure, and other methods that satisfy relevant laws and regulations may also be applied to the implementation of the present disclosure.

In order to facilitate understanding of the present disclosure, a data transmission method disclosed in the embodiments of the present disclosure is first introduced in detail. The execution subject of the data transmission method provided by the embodiments of the present disclosure is a client, and the client may be, for example, a personal computer, a tablet computer, a smart phone, etc. In some possible implementations, the data transmission method may be implemented by a processor calling computer-readable instructions stored in a memory.

Refer to FIG. 1, which is a flowchart of a data transmission method provided by the embodiments of the present disclosure, the data transmission method includes steps 101 to 103.

Step 101: generating, in response to a data transmission instruction, a first key based on a temporary private key generated by the client and a first public key generated by a target server;

Step 102: encrypting target data in data to be transmitted to obtain target encryption data based on the first key;

Step 103: sending target transmission data to the target server to cause the target server to generate a second key corresponding to the first key based on a temporary public key and a first private key corresponding to the first public key, and to decrypt the target encryption data based on the second key, in which the target transmission data includes the temporary public key generated by the client corresponding to the temporary private key, the target encryption data, and other data in the data to be transmitted except the target data.

The following is a detailed description for the above-mentioned steps.

For step 101:

Specifically, the data transmission instruction may be generated in response to a first triggering operation, which includes but not limited to click, double click, long press, slide, drag, etc. For example, the data transmission instruction may be generated in response to a click operation on a target button.

In a possible embodiment, after responding to the data transmission instruction, the client may send a data transmission request to the target server and receive a verification certificate sent by the target server. Specifically, the verification certificate may be, for example, a Secure Socket Layer (SSL) certificate, also known as an SSL certificate. The verification certificate may include a second public key, data to be verified, and signature data. The data to be verified may include data such as the issuing object, issuer, and validity period of the verification certificate. By verifying the data to be verified, it can be determined whether the data sent by the target server to the client has been tampered with. For example, the signature data may be decrypted by the second public key to obtain first verification data, and the data to be verified may be processed using a preset algorithm (such as a hash function) to obtain second verification data. In the case that the first verification data and the second verification data are consistent, it is determined that the verification certificate has not been tampered with.

In a possible embodiment, when generating the first key based on the temporary private key generated by the client and the first public key generated by the target server, the first key may be generated based on the temporary private key, the first public key, at least one random number, and a target key generation algorithm. For example, at least one random number may be generated by the client and/or the target server, and the random number generated by the target server may be sent to the client by the target server after receiving a data transmission request.

In a possible embodiment, the temporary private key may be generated through the following method: generating, in response to satisfying a key generation condition, the temporary private key and the temporary public key corresponding to the temporary private key based on a preset key generation algorithm.

Exemplarily, the key generation condition may include: in response to a startup of a target application, in response to a data transmission instruction, the time interval between the current time and the most recent generation time of the last temporary key (including temporary private key and temporary public key) exceeds a preset time, etc. In a specific example, the temporary key may be deleted in response to the shutdown of the target application, and the temporary key may be generated in response to the startup of the target application. In another example, the temporary key may be generated when the time interval between the current time and the most recent generation time exceeds one week. Exemplarily, the preset key generation algorithm may be a key generation algorithm in Elliptic Curve Cryptography (ECC) algorithm, and the embodiments of the present disclosure do not limit other key generation algorithms. By adopting this method, the temporary key can be automatically updated, making the temporary key time-sensitive, thereby ensuring information security.

For step 102:

The target data that needs to be encrypted in the data to be transmitted may be pre-set, and exemplarily, the target data may be sensitive data (such as personal data of users). Alternatively, in another possible embodiment, content recognition may be performed on the data to be transmitted, and in the case that a preset keyword is detected in the data to be transmitted, the field containing the preset keyword in the data to be transmitted may be determined as the target data. Exemplarily, the preset keyword may include address, contact phone number, itinerary information, etc.

For example, in the case where the temporary key is generated based on a key generation algorithm in the ECC algorithm, the target data can be encrypted based on a key encryption algorithm in the ECC algorithm. The embodiments of the present disclosure do not limit other key encryption algorithms.

For step 103:

Exemplarily, the other data may include an address of a request, data length, supported language format, etc. Here, in the case where the data to be transmitted (and any item of data in the data to be transmitted) includes non-sensitive data other than the target data (such as sensitive data), the other data also includes the non-sensitive data, for example, a certain field in the data to be transmitted includes user privacy data and public data released publicly by the user, then the user privacy data is the target data, and the other data includes the public data.

If only the target data in the data to be transmitted is encrypted, other data in the data to be transmitted except the target data may be intercepted and obtained. Therefore, after encrypting the target data, the data to be transmitted may also be encrypted. Specifically, in a possible embodiment, when sending the target transmission data to the target server, a second public key contained in the verification certificate may be determined first; then, the target transmission data is encrypted based on the second public key to obtain the encrypted target transmission data; finally, the encrypted target transmission data is sent to the target server.

Specifically, after verifying the verification certificate, the second public key in the verification certificate is obtained, and when encrypting the target transmission data based on the second public key, exemplarily, the RSA algorithm, the Data Encryption Standard (DES), etc. may be used, the embodiments of the present disclosure do not limit other encryption algorithms. By encrypting the target transmission data into the encrypted target transmission data, even if the encrypted target transmission data is intercepted by other terminals, the encrypted target transmission data cannot be decrypted, thereby ensuring information security.

In a possible embodiment, when sending the target transmission data to the target server, the target transmission data may be sent to at least one intermediate server to cause the at least one intermediate server to send the target transmission data to the target server.

For example, the at least one intermediate server includes at least one selected from a group consisting of a load balancing server, a gateway server, and a cache server. The load balancing server is configured to allocate servers for request data (that is, the target transmission data in the embodiments of the present disclosure) sent by clients; the gateway server (Gateway) is configured to determine the communication protocol and the data format, perform data language conversion and security audit, etc. for the request data; and the cache server is configured to generate response data for the request data. For example, in a network composed of a plurality of servers, such as a Content Delivery Network (CDN), each CDN node is the at least one intermediate server, and a device node in a Mesh Network is the at least one intermediate server.

Specifically, in the case where there is only one intermediate server, after the client sends the target transmission data to the intermediate server, the intermediate server can send the target transmission data to the target server; and in the case where there are a plurality of intermediate servers, after the intermediate server of the previous node receives the target transmission data, the target transmission data can be sent to the intermediate server of the next node, and finally the intermediate server of the last node sends the target transmission data to the target server.

It may be understood that after the client sends the target transmission data, a plurality of intermediate servers are usually required to process the target transmission data and then send the target transmission data to the target server. However, because the intermediate server can only obtain the temporary public key sent by the client, and the key for decrypting the target encryption data cannot be generated, it is not possible to generate a key to decrypt the target encryption data, the intermediate server can only obtain plaintext information of the other data, and cannot obtain the target data.

In a possible embodiment, when sending the target transmission data to at least one intermediate server, the second public key contained in the verification certificate may be determined first; then the target transmission data is encrypted based on the second public key to obtain the encrypted target transmission data; finally, the encrypted target transmission data is sent to at least one intermediate server.

Specifically, in the case where there is only one intermediate server, after the client sends the encrypted target transmission data to the intermediate server, the intermediate server can send the encrypted target transmission data to the target server; and in the case where there are a plurality of intermediate servers, after the intermediate server of the previous node receives the encrypted target transmission data, the encrypted target transmission data can be sent to the intermediate server of the next node, and finally the intermediate server of the last node sends the encrypted target transmission data to the target server.

It may be understood that the at least one intermediate server stores a second private key corresponding to the second public key, and the at least one intermediate server can decrypt the encrypted target transmission data received based on the second private key to obtain the target transmission data (including the temporary public key, the target encryption data, and other data). Therefore, the at least one intermediate server can obtain plaintext data of the other data, but because the at least one intermediate server cannot obtain a key for decrypting the target encryption data, the at least one intermediate server cannot decrypt the target encryption data to obtain the target data. Therefore, by adopting this method, it is possible to enable the at least one intermediate server to process the other data without being able to view the target data, thereby ensuring the data security of the target data.

Here, it should be noted that after the intermediate server of any node decrypts the encrypted target transmission data into the target transmission data, when sending data to the intermediate server of the next node or the target server, the encrypted target transmission data may be sent, or the target transmission data may be sent.

The data transmission method provided by the embodiments of the present disclosure can generate, after responding to a data transmission instruction, a first key based on a temporary private key generated by the client and a first public key generated by a target server; then encrypt target data in data to be transmitted to obtain target encryption data based on the first key; and finally, send target transmission data, which includes a temporary public key generated by the client corresponding to the temporary private key, the target encryption data, and other data in the data to be transmitted except the target data, to the target server. In this way, because the target server receives the temporary public key and a first private key corresponding to the first public key is stored in the target server, the target server can generate a second key corresponding to the first key, and decrypt the target encryption data based on the second key to obtain the target data. Even if an intermediate server obtains the target encryption data, because the intermediate server can only obtain the temporary public key, and cannot generate a key to decrypt the target encryption data, the target encryption data cannot be decrypted to obtain the target data, thereby ensuring the data security of the target data and avoiding leakage of the target data.

Based on the same invention concept, the embodiments of the present disclosure further provide a data transmission method applied to a target server, as illustrated in FIG. 2, which is a flowchart of the data transmission method provided by the embodiments of the present disclosure, the data transmission method includes steps 201 to 202.

Step 201: receiving target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server.

Step 202: generating a second key corresponding to the first key based on the temporary public key and a first private key corresponding to the first public key, and decrypting the target encryption data based on the second key.

The following is a detailed explanation for the above-mentioned steps.

For step 201:

In a possible embodiment, before executing step 201, the target server may generate a first public key and a first private key corresponding to the first public key. The first public key and the first private key are keys for asymmetric encryption, and the data encrypted by the first public key can be decrypted by the first private key. For example, the first public key and the first private key may be generated based on the ECC algorithm, and then the target server can transmit the first public key to the client.

Here, the first public key and the first private key may be generated when the target server first receives the data transmission request.

In order to prevent the first public key from being maliciously intercepted and stolen by other terminals, in a possible embodiment, the first public key generated by the target server may be transmitted to the client through a non-network transmission method. Exemplarily, the non-network transmission method may be Bluetooth transmission, manual input, wired transmission, etc. By adopting this method, the first public key can be securely transmitted to the client.

In a possible embodiment, in order to verify the identity of the target server, the target server may also receive a data transmission request sent by the client and send a verification certificate to the client, so that the client can verify the identity of the target server based on the verification certificate.

The verification certificate includes a second public key, and the second public key and a second private key corresponding to the second public key may be pre-generated by the target server. For example, the second public key and the second private key may be generated based on an RSA algorithm.

Then, when receiving the target transmission data sent by the client, the encrypted target transmission data sent by the client may be received first. The encrypted target transmission data includes data obtained by encrypting the target transmission data based on the second public key in the verification certificate. Then, the encrypted target transmission data can be decrypted based on the second private key corresponding to the second public key to obtain the target transmission data.

By adopting this method, the target transmission data can be transmitted in an encrypted form during the transmission process, so that other terminals cannot decrypt the encrypted target transmission data even after intercepting the encrypted target transmission data, thereby ensuring data transmission security.

Here, it should be noted that in the case where the encrypted target transmission data is encrypted based on a symmetric encryption algorithm, the target server can decrypt the encrypted target transmission data based on the second public key.

For step 202:

Specifically, when generating the second key corresponding to the first key based on the temporary public key and the first private key corresponding to the first public key, the second key may be generated based on the first private key, the temporary public key, at least one random number, and the target key generation algorithm. The at least one random number may be generated by the client and/or the target server, and the random number generated by the client may be sent to the target server by the client.

The first key and the second key may be symmetric keys, for example, Elliptic Curve Diffie-Hellman Key Exchange (ECDH) may be adopted. In the case that the temporary public key and the temporary private key are generated based on the ECC algorithm, and the first public key and the first private key are generated based on the ECC algorithm, the first key generated based on the first public key and the temporary private key, and the second key generated based on the first private key and the temporary public key are symmetric keys, and the data encrypted by the first key can be decrypted by the second key.

Finally, after the target server decrypts the encrypted target encryption data based on the second key, the target server can process the other data and the target data.

Based on the same invention concept, the embodiments of the present disclosure further provide a data transmission system, as illustrated in FIG. 3, which is a schematic diagram of a data transmission system provided by the embodiments of the present disclosure, the data transmission system includes:

a client 301, which is configured to generate, in response to a data transmission instruction, a first key based on a temporary private key generated by the client and a first public key generated by a target server, encrypt target data in data to be transmitted to obtain the target encryption data based on the first key, and send target transmission data to the target server, in which the target transmission data includes a temporary public key generated by the client corresponding to the temporary private key, the target encryption data, and other data in the data to be transmitted except the target data;

and a target server 302, which is configured to generate a second key corresponding to the first key based on the temporary public key and a first private key corresponding to the first public key, and decrypt the target encryption data based on the second key.

Figure 4:
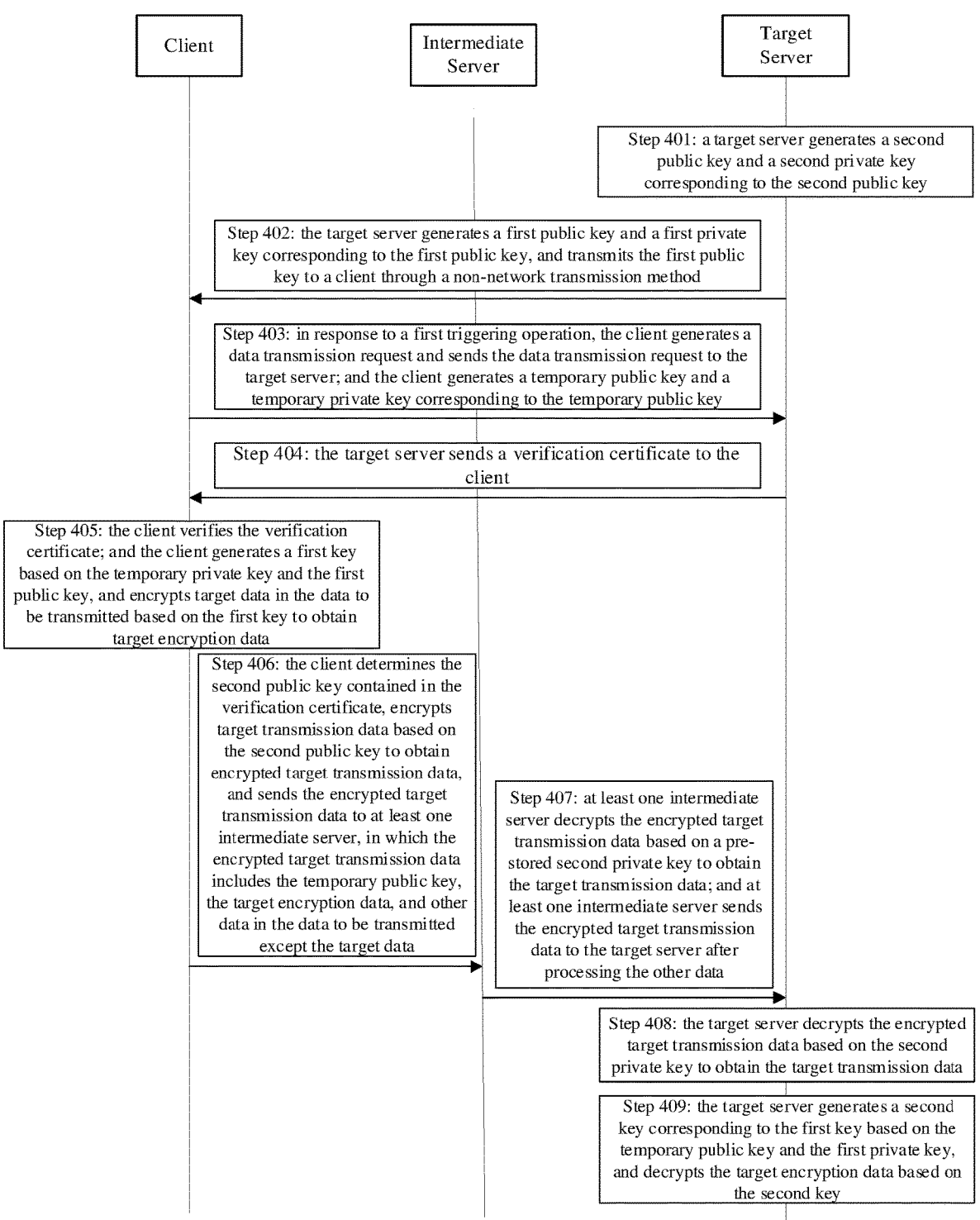
FIG. 4 illustrates an overall flowchart of a data transmission method provided by the embodiments of the present disclosure.

Finally, as illustrated in FIG. 4, an overall flowchart of a data transmission method provided by the embodiments of the present disclosure includes the following steps 401 to 409.

Step 401: a target server generates a second public key and a second private key corresponding to the second public key.

Step 402: the target server generates a first public key and a first private key corresponding to the first public key, and transmits the first public key to a client through a non-network transmission method.

Here, the execution order of steps 401 and 402 are executed in no particular order, and steps 401 and 402 may also be executed after step 403.

Step 403: in response to a first triggering operation, the client generates a data transmission request and sends the data transmission request to the target server; and the client generates a temporary public key and a temporary private key corresponding to the temporary public key.

Step 404: the target server sends a verification certificate to the client.

Step 405: the client verifies the verification certificate; and the client generates a first key based on the temporary private key and the first public key, and encrypts target data in the data to be transmitted based on the first key to obtain target encryption data.

Step 406: the client determines the second public key contained in the verification certificate, encrypts target transmission data based on the second public key to obtain encrypted target transmission data, and sends the encrypted target transmission data to at least one intermediate server, in which the encrypted target transmission data includes the temporary public key, the target encryption data, and other data in the data to be transmitted except the target data.

Step 407: at least one intermediate server decrypts the encrypted target transmission data based on a pre-stored second private key to obtain the target transmission data; and at least one intermediate server sends the encrypted target transmission data to the target server after processing the other data.

Step 408: the target server decrypts the encrypted target transmission data based on the second private key to obtain the target transmission data.

Step 409: the target server generates a second key corresponding to the first key based on the temporary public key and the first private key, and decrypts the target encryption data based on the second key.

Those skilled in the art may understand that in the above-mentioned methods of specific embodiments, the writing order of respective steps does not mean a strict execution order and does not constitute any limitation on the implementation process. The specific execution order of respective steps should be determined based on functions and possible internal logic of the respective steps.

Based on the same invention concept, the embodiments of the present disclosure further provide a data transmission apparatus corresponding to the data transmission method. Because the problem-solving principle of the apparatus in the embodiments of the present disclosure is similar to the above-mentioned data transmission method in the embodiments of the present disclosure, the implementation of the apparatus may be referred to the implementation of the method, and repeated details will not be described again.

Figure 5:
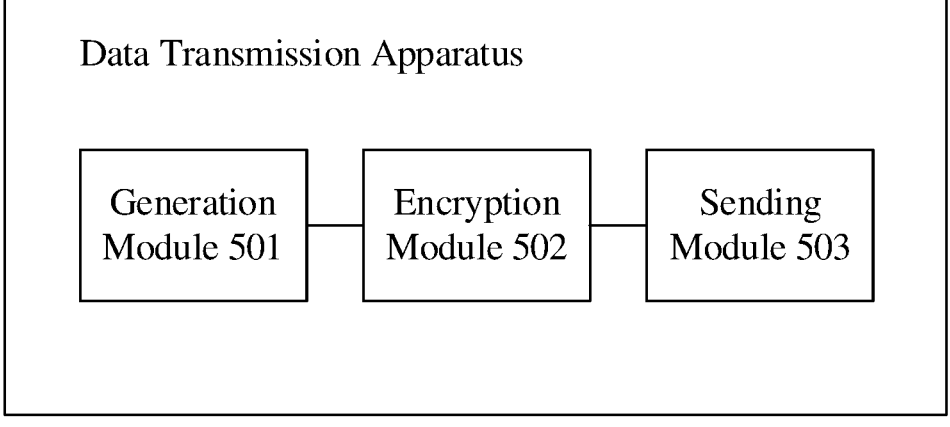
FIG. 5 illustrates a schematic diagram of an architecture of a data transmission apparatus provided by the embodiments of the present disclosure.

Referring to FIG. 5, which is a schematic diagram of an architecture of a data transmission apparatus provided by the embodiments of the present disclosure, the data transmission apparatus includes a generation module 501, an encryption module 502, and a sending module 503.

The generation module 501 is configured to generate, in response to a data transmission instruction, a first key based on a temporary private key generated by the client and a first public key generated by a target server.

The encryption module 502 is configured to encrypt target data in data to be transmitted to obtain target encryption data based on the first key.

The sending module 503 is configured to send target transmission data to the target server to cause the target server to generate a second key corresponding to the first key based on a temporary public key and a first private key corresponding to the first public key, and to decrypt the target encryption data based on the second key, in which the target transmission data includes the temporary public key generated by the client corresponding to the temporary private key, the target encryption data, and other data in the data to be transmitted except the target data.

In a possible embodiment, after responding to the data transmission instruction, the data transmission apparatus is further configured to:

send a data transmission request to the target server; and receive a verification certificate sent by the target server.

The sending module 503, when sending the target transmission data to the target server, is configured to:

determine a second public key included in the verification certificate;

encrypt the target transmission data based on the second public key to obtain encrypted target transmission data;

and send the encrypted target transmission data to the target server.

In a possible embodiment, the sending module 503, when sending the target transmission data to the target server, is configured to:

send the target transmission data to at least one intermediate server to cause the at least one intermediate server to send the target transmission data to the target server.

In a possible embodiment, the at least one intermediate server includes at least one selected from a group consisting of a load balancing server, a gateway server, and a cache server.

In a possible embodiment, the data transmission apparatus is further configured to:

generate, in response to satisfying a key generation condition, the temporary private key and the temporary public key corresponding to the temporary private key based on a preset key generation algorithm.

Figure 6:
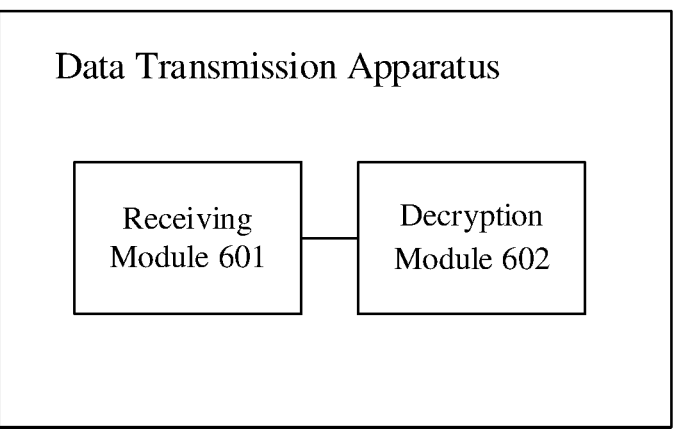
FIG. 6 illustrates a schematic diagram of an architecture of another data transmission apparatus provided by the embodiments of the present disclosure.

Referring to FIG. 6, which is a schematic diagram of an architecture of another data transmission apparatus provided by the embodiments of the present disclosure, the data transmission apparatus includes a receiving module 601 and a decryption module 602.

The receiving module 601 is configured to receive target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server.

The decryption module 602 is configured to generate a second key corresponding to the first key based on the temporary public key and a first private key corresponding to the first public key, and decrypt the target encryption data based on the second key.

In a possible embodiment, the data transmission apparatus is further configured to:

receive a data transmission request sent by the client, and send a verification certificate to the client.

The receiving module 601, when receiving the data transmission data sent by the client, is configured to:

receive encrypted target transmission data sent by the client, in which the encrypted target transmission data includes data obtained by encrypting the target transmission data based on a second public key in the verification certificate;

and decrypt the encrypted target transmission data based on a second private key corresponding to the second public key, to obtain the target transmission data.

In a possible embodiment, the first public key generated by the target server is transmitted to the client through a non-network transmission method.

The description of the processing flow of respective modules in the apparatus and the interaction flow between respective modules may be referred to the relevant descriptions in the above-mentioned method embodiments, and will not be described in detail herein.

Figure 7:
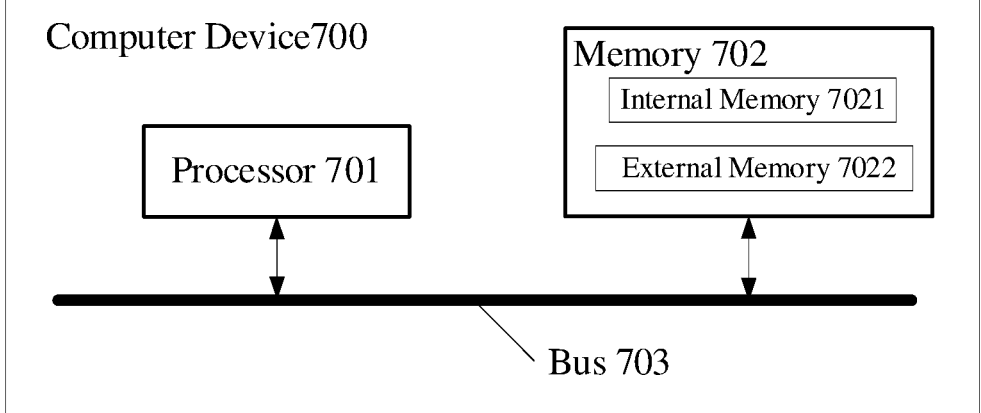
FIG. 7 illustrates a schematic diagram of a structure of a computer device provided by the embodiments of the present disclosure.

Based on the same technical concept, the embodiments of the present disclosure further provide a computer device. Referring to FIG. 7, which is a schematic diagram of a structure of a computer device 700 provided by the embodiments of the present disclosure, the computer device 700 includes a processor 701, a memory 702, and a bus 703. The memory 702 is configured to store execution instructions, including a memory 7021 and an external memory 7022; the memory 7021 here is also called an internal memory, and is configured to temporarily store the operation data in the processor 701, as well as the data exchanged with the external memory 7022 such as a hard disk, and the processor 701 exchanges data with the external memory 7022 through the memory 7021. When the computer device 700 is running, the processor 701 communicates with the memory 702 through the bus 703, causing the processor 701 to execute the following instructions:

generating, in response to a data transmission instruction, a first key based on a temporary private key generated by the client and a first public key generated by a target server;

encrypting target data in data to be transmitted to obtain target encryption data based on the first key;

and sending target transmission data to the target server to cause the target server to generate a second key corresponding to the first key based on a temporary public key and a first private key corresponding to the first public key, and to decrypt the target encryption data based on the second key, in which the target transmission data includes the temporary public key generated by the client corresponding to the temporary private key, the target encryption data, and other data in the data to be transmitted except the target data.

In a possible embodiment, in the instructions executed by the processor 701, after responding to the data transmission instruction, the data transmission method further includes:

sending a data transmission request to the target server;

and receiving a verification certificate sent by the target server.

Sending the target transmission data to the target server includes:

determining a second public key included in the verification certificate;

encrypting the target transmission data based on the second public key to obtain encrypted target transmission data;

and sending the encrypted target transmission data to the target server.

In a possible embodiment, in the instructions executed by the processor 701, sending the target transmission data to the target server includes:

sending the target transmission data to at least one intermediate server to cause the at least one intermediate server to send the target transmission data to the target server.

In a possible embodiment, in the instructions executed by the processor 701, the at least one intermediate server includes at least one selected from a group consisting of a load balancing server, a gateway server, and a cache server.

In a possible embodiment, in the instructions executed by the processor 701, the data transmission method further includes:

generating, in response to satisfying a key generation condition, the temporary private key and the temporary public key corresponding to the temporary private key based on a preset key generation algorithm.

Or the processor 701 may execute the following instructions:

receiving target transmission data sent by a client, in which the target transmission data includes a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server;

and generating a second key corresponding to the first key based on the temporary public key and a first private key corresponding to the first public key, and decrypting the target encryption data based on the second key.

In a possible embodiment, in the instructions executed by the processor 701, the data transmission method further includes:

receiving a data transmission request sent by the client, and sending a verification certificate to the client.

Receiving the data transmission request sent by the client includes:

receiving encrypted target transmission data sent by the client, in which the encrypted target transmission data includes data obtained by encrypting the target transmission data based on a second public key in the verification certificate;

and decrypting the encrypted target transmission data based on a second private key corresponding to the second public key, to obtain the target transmission data.

In a possible embodiment, in the instructions executed by the processor 701, the first public key generated by the target server is transmitted to the client through a non-network transmission method.

The embodiments of the present disclosure further provide a computer-readable storage medium, a computer program is stored on the computer-readable storage medium, and when the computer program is run by a processor, the data transmission method in the above-mentioned method embodiments is implemented. The storage medium may be a volatile or non-volatile computer-readable storage medium.

The embodiments of the present disclosure further provide a computer program product, which carries program code. The program code includes instructions that can be used to execute the data transmission method described in the above-mentioned method embodiments. Please refer to the above method embodiment for details, which will not be repeated here.

For example, the above-mentioned computer program product may be specifically implemented by hardware, software or a combination thereof. In an optional embodiment, the computer program product is embodied as a computer storage medium. In another optional embodiment, the computer program product is embodied as a software product, such as a Software Development Kit (SDK), etc.

Those skilled in the art can clearly understand that for the convenience and simplicity of description, the specific working processes of the systems and apparatuses described above can be referred to the corresponding processes in the foregoing method embodiments, and will not be described again herein. In the several embodiments provided in the present disclosure, it should be understood that the disclosed systems, apparatuses and methods can be implemented in other ways. The apparatus embodiments as described above are only schematic, for example, the division of the units may be logical functional division; in actual implementation, there may be other division modes, for another example, a plurality of units or components may be combined or integrated into another system, or some features may be ignored or not executed. On the other hand, the coupling or direct coupling or communication connection displayed or discussed between each other may be indirect coupling or communication connection through some interfaces, apparatuses, or units, which may be in a form of electrical, mechanical or other forms.

The above-mentioned units illustrated as separate components may be, or may not be physically separated, and the components displayed as units may be, or may not be, physical units, that is, they may be at one place, or may also be distributed to a plurality of network units; and some or all of the units may be selected according to actual needs to achieve the purpose of the solutions of the present embodiment.

In addition, the respective functional units in the respective embodiments of the present disclosure may be integrated in one processing unit, or each unit may physically exist separately, or two or more units may be integrated in one unit.

In the case that the functions are implemented in a form of software functional unit and sold or used as an independent product, they may be stored in a non-volatile computer-readable storage medium that is executable by a processor. Based on such understanding, the technical solutions of the present disclosure, in essence, or the part that contributes to the prior art, or all or part of the technical solutions, may be embodied in a form of a software product; the computer software product is stored in a storage medium and includes several instructions so that a computer device (which may be a personal computer, a server, or a network device, etc.) to execute all or part of steps of the methods according to the respective embodiments of the present disclosure. The foregoing storage medium includes a USB flash disk, a removable hard disk, a Read-Only Memory (ROM), a Random Access Memory (RAM), a magnetic disk or an optical disk, and various other media that can store program codes.

Finally, it should be noted that the above-mentioned embodiments are only specific implementations of the present disclosure to illustrate the technical solutions of the present disclosure rather than to limit them, and the protection scope of the present disclosure is not limited thereto. Although the present disclosure has been described in detail with reference to the foregoing embodiments, those of ordinary skill in the art should understand that, within the scope of the technology disclosed in the present disclosure, any person of skill familiar with the technical field can still modify or easily think of changes to the technical solutions recorded in the foregoing embodiments, or make equivalent substitutions for some of the technical features therein; and these modifications, changes or substitutions, which do not detach the essence of the corresponding technical solutions from the spirit and scope of the technical solutions of the embodiments of the present disclosure, shall be covered within the protection scope of the present disclosure. Therefore, the protection scope of the present disclosure should be determined by the protection scope of the claims.

The invention claimed is:

1. A data transmission method, applied to a client, comprising:

generating, in response to a data transmission instruction, a first key based on a temporary private key generated by the client and a first public key generated by a target server;

encrypting target data in data to be transmitted to obtain target encryption data based on the first key; and sending target transmission data to the target server to cause the target server to generate a second key corresponding to the first key based on a temporary public key and a first private key corresponding to the first public key, and to decrypt the target encryption data based on the second key, wherein the target transmission data comprises the temporary public key generated by the client corresponding to the temporary private key, the target encryption data, and other data in the data to be transmitted except the target data.

2. The data transmission method according to claim 1, wherein after responding to the data transmission instruction, the data transmission method further comprises:

sending a data transmission request to the target server; and receiving a verification certificate sent by the target server; and sending the target transmission data to the target server comprises:

determining a second public key comprised in the verification certificate;

encrypting the target transmission data based on the second public key to obtain encrypted target transmission data; and sending the encrypted target transmission data to the target server.

3. The data transmission method according to claim 1, wherein sending the target transmission data to the target server comprises:

sending the target transmission data to at least one intermediate server to cause the at least one intermediate server to send the target transmission data to the target server.

4. The data transmission method according to claim 3, wherein the at least one intermediate server comprises at least one selected from a group consisting of a load balancing server, a gateway server, and a cache server.

5. The data transmission method according to claim 1, further comprising:

generating, in response to satisfying a key generation condition, the temporary private key and the temporary public key corresponding to the temporary private key based on a preset key generation algorithm.

6. A data transmission method, applied to a target server, comprising:

receiving target transmission data sent by a client, wherein the target transmission data comprises a temporary public key generated by the client, target encryption data, and other data in data to be transmitted except target data, the target encryption data is data obtained by encrypting the target data in the data to be transmitted based on a first key, and the first key is generated by the client based on a temporary private key corresponding to the temporary public key and a first public key generated by the target server; and generating a second key corresponding to the first key based on the temporary public key and a first private key corresponding to the first public key, and decrypting the target encryption data based on the second key.

7. The data transmission method according to claim 6, further comprising:

receiving a data transmission request sent by the client, and sending a verification certificate to the client, wherein receiving the target transmission data sent by the client comprises:

receiving encrypted target transmission data sent by the client, wherein the encrypted target transmission data comprises data obtained by encrypting the target transmission data based on a second public key in the verification certificate; and decrypting the encrypted target transmission data based on a second private key corresponding to the second public key, to obtain the target transmission data.

8. The data transmission method according to claim 6, wherein the first public key generated by the target server is transmitted to the client through a non-network transmission method.

9. A data transmission system, comprising:

a client, configured to generate, in response to a data transmission instruction, a first key based on a temporary private key generated by the client and a first public key generated by a target server, encrypt target data in data to be transmitted to obtain the target encryption data based on the first key, and send target transmission data to the target server, wherein the target transmission data comprises a temporary public key generated by the client corresponding to the temporary private key, the target encryption data, and other data in the data to be transmitted except the target data; and a target server, configured to generate a second key corresponding to the first key based on the temporary public key and a first private key corresponding to the first public key, and decrypt the target encryption data based on the second key.

10. A computer device, comprising a processor, a memory and a bus, wherein the memory stores machine-readable instructions executable by the processor, and when the computer device is running, the processor and the memory communicate with each other through the bus; and when the machine-readable instructions are executed by the processor, the data transmission method according to claim 1 is implemented.

11. A computer device, comprising a processor, a memory and a bus, wherein the memory stores machine-readable instructions executable by the processor, and when the computer device is running, the processor and the memory communicate with each other through the bus; and when the machine-readable instructions are executed by the processor, the data transmission method according to claim 6 is implemented.

12. A non-transitory computer-readable storage medium, wherein a computer program is stored on the computer-readable storage medium, and when the computer program is run by a processor, the data transmission method according to claim 1 is implemented.

13. A non-transitory computer-readable storage medium, wherein a computer program is stored on the computer-readable storage medium, and when the computer program is run by a processor, the data transmission method according to claim 6 is implemented.

* * * * *